United States Patent [19]
Hutton

[11] Patent Number: 5,959,768
[45] Date of Patent: Sep. 28, 1999

[54] LIGHT PATTERN GENERATOR FORMED ON A TRANSPARENT SUBSTRATE

[75] Inventor: Richard W. Hutton, Irving, Tex.

[73] Assignee: Vari-Lite, Inc., Dallas, Tex.

[21] Appl. No.: 08/714,963

[22] Filed: Sep. 17, 1996

Related U.S. Application Data

[63] Continuation of application No. 08/147,496, Nov. 5, 1993, abandoned.

[51] Int. Cl.[6] .............................. G02B 5/08; G02B 27/14
[52] U.S. Cl. ......................... 359/359; 359/634; 359/583; 353/62; 362/293
[58] Field of Search ........................... 362/293; 359/350, 359/360, 614, 359, 587, 634, 583, 585, 589, 590; 353/20, 22, 37, 52, 55, 56, 62, 84; 430/7; 219/121.68, 121.69

[56] References Cited

U.S. PATENT DOCUMENTS

| | | | |
|---|---|---|---|
| 1,765,242 | 6/1930 | Reiter ...................................... | 362/293 |
| 2,269,494 | 1/1942 | Tillyer ..................................... | 359/350 |
| 2,647,441 | 8/1953 | Boydston et al. ....................... | 359/585 |
| 2,667,807 | 2/1954 | Hahn ...................................... | 359/350 |
| 3,704,928 | 12/1972 | Coombs et al. ......................... | 359/359 |
| 3,747,117 | 7/1973 | Fechter ....................................... | 346/1 |
| 3,754,135 | 8/1973 | Hulbert, Jr. ............................ | 362/293 |
| 3,914,464 | 10/1975 | Thomasson et al. ..................... | 427/54 |
| 3,981,568 | 9/1976 | Bartolomei .............................. | 359/590 |
| 4,013,466 | 3/1977 | Klaiber ...................................... | 96/36 |
| 4,158,715 | 6/1979 | Smith et al. ............................. | 428/412 |
| 4,245,003 | 1/1981 | Oransky et al. ........................ | 423/323 |
| 4,534,620 | 8/1985 | Gale et al. .............................. | 359/589 |
| 4,586,116 | 4/1986 | Kasboske ................................ | 362/293 |
| 4,779,176 | 10/1988 | Bornhorst ................................ | 362/223 |
| 4,818,098 | 4/1989 | Kahn et al. ............................. | 353/122 |
| 4,831,436 | 5/1989 | Birgmeir et al. ........................ | 358/75 |
| 4,890,208 | 12/1989 | Izenour ................................... | 362/294 |
| 4,958,265 | 9/1990 | Solomon ................................. | 362/293 |
| 4,974,136 | 11/1990 | Noori-Shad et al. .................... | 362/293 |
| 5,022,726 | 6/1991 | Austin et al. ............................ | 359/360 |
| 5,061,341 | 10/1991 | Kildal et al. ....................... | 219/121.69 |
| 5,120,622 | 6/1992 | Hanrahan ................................... | 430/7 |
| 5,217,832 | 6/1993 | Joslin et al. ............................... | 430/7 |
| 5,246,803 | 9/1993 | Hanrahan et al. .......................... | 430/7 |
| 5,257,132 | 10/1993 | Ceglio et al. ........................... | 359/589 |
| 5,262,895 | 11/1993 | LaDuke et al. ......................... | 359/634 |
| 5,266,771 | 11/1993 | Van Wyk ............................ | 219/121.69 |
| 5,289,315 | 2/1994 | Makita et al. ........................... | 359/634 |
| 5,296,674 | 3/1994 | Praschek et al. .................... | 219/121.69 |
| 5,296,961 | 3/1994 | Trost et al. .............................. | 359/359 |
| 5,340,619 | 8/1994 | Chen et al. .............................. | 424/498 |
| 5,354,633 | 10/1994 | Lewis et al. ................................ | 430/5 |
| 5,356,662 | 10/1994 | Early et al. .............................. | 427/140 |
| 5,395,678 | 3/1995 | Matsushima et al. .................. | 359/359 |
| 5,450,230 | 9/1995 | Masuda et al. .......................... | 359/254 |
| 5,456,955 | 10/1995 | Muggli ..................................... | 427/555 |
| 5,480,722 | 1/1996 | Tomonaga et al. ..................... | 359/359 |
| 5,510,215 | 4/1996 | Prince et al. ............................ | 359/359 |

FOREIGN PATENT DOCUMENTS

| | | | |
|---|---|---|---|
| 0080182 | 6/1983 | European Pat. Off. ............... | 359/359 |
| 0448125 | 9/1991 | European Pat. Off. ............... | 362/293 |
| 0049302 | 2/1990 | Japan ..................................... | 359/359 |
| 2 176 018 | 12/1985 | United Kingdom . | |

OTHER PUBLICATIONS

IBM Technical Disclosure Bulletin, vol. 13, No. 2, Jul. 1970, pp.542–543.

English language abstract of JP–A–01 267 092, Oct. 24, 1989.

Birnie, et. al., "Laser Processing of Chemically Derived Dichroic Filters", Optical Engineering, vol. 32, No. 11, Nov. 1993, pp. 2960–2965.

Stevenson, "Laser–marking system design and selection", 1993 Industrial Laser Review Buyers Guide. Laser Focus World Publications, Westford, MA, Dec. 1993 pp. 12–14.

*Primary Examiner*—Cassandra Spyrou
*Assistant Examiner*—John Juba, Jr.
*Attorney, Agent, or Firm*—Hughes & Luce, L.L.P.

[57] ABSTRACT

A light pattern generator includes a reflective layer absorptive to infra-red radiation from which a desired pattern has been removed to allow passage of a light beam in the shape of the pattern. A method for making a light pattern generator includes forming a layer of reflective material on a transparent substrate and ablating a portion of the layer with a laser to create a desired pattern.

13 Claims, 7 Drawing Sheets

LIGHT PATTERN GENERATOR FORMED ON A TRANSPARENT SUBSTRATE

This is a continuation of application Ser. No. 08/147,496, filed on Nov. 5, 1993 now abandoned.

FIELD OF THE INVENTION

The present invention relates to stage lighting equipment, particularly to projection of images by stage lighting equipment and to a method and apparatus for making a light pattern generator on a transparent substrate for use in such equipment.

BACKGROUND OF THE INVENTION

A significant feature of stage lighting systems is the projection of images by stage lighting instruments. Images are typically formed by passing a light beam through a light pattern generator or "gobo" and projecting the image formed thereby. A typical gobo is made of a sheet of metal which has the desired image cut from the sheet to form an opening for shaping a light beam passing therethrough. A gobo therefore operates as a light stencil, blocking some portions of the light beam and passing other portions. A typical configuration for creating a pattern of light consists of a gobo placed in a projection gate located at a focal plane of a light projector having a light source, a reflector which focuses light rays to the focal plane, and one or more lenses to project an image formed at the focal plane.

Conventional gobos are limited as to the images that can be produced. Since all of the metal elements of a gobo must be supported, there must often be unwanted support members included in the design. As an example, it is impossible to produce a complete ring design because support members must extend from the exterior to support the interior metal.

Many conventional gobos are stamped out of sheet metal, which makes them very inexpensive when produced in large quantities. The gobos are mounted directly in the intense light beams used in stage lighting, and can become hot enough to glow with a cherry red color. The intense heat produced by the light beam is absorbed by the metal gobo and causes it to soften, warp, and therefore distort the desired image. Some gobos include very thin connecting links supporting internal metal portions of the light stencil from the exterior portions. These thin connecting links, however, are particularly susceptible to damage from the heat of the beam, and under some circumstances can burn through completely, such that the image is severely distorted and the gobo destroyed.

In an effort to produce heat-tolerant gobos, some gobos have been made of heat resistant materials, such as stainless steel, using a laser beam to cut out the desired image. However, even gobos made of these materials have a relatively short lifetime and require frequent replacement. Although the laser-cutting process can produce more complex images than can be stamped, these images are usually characterized by a greater quantity of very thin connecting links and other fine details which can be destroyed in the intense heat of the light beam.

Laser cutting processes used to make aluminum gobos and stainless steel gobos utilize a carbon-dioxide laser, which has a characteristic wavelength of 10.6 micrometers and a typical beam diameter of 12–15 millimeters, or about one-half inch. One such process directs the laser beam through a mask and onto the blank metal gobo. The mask must be reflective to the laser wavelength (10.6 um) and have an opening formed therein in the shape of the desired image. Gold is frequently utilized as the preferred material for reflecting this laser wavelength. Because gold is a relatively expensive material, the cost can be justified only when a relatively large number of identical gobos are to be manufactured.

A second process directs the laser beam through one or more lenses to focus the beam to a smaller diameter, and then directs the beam onto a blank gobo which is mounted on a movable support table. The support table is movable in two axes and is controlled to move the blank gobo so that the laser beam cuts the desired image. This process is more economical than the mask process described above if relatively few gobos are to be manufactured, but the process is still relatively slow. Lenses which are suitable for transmitting and focusing the 10.6 micrometer laser beam are made of exotic and expensive materials, such as: zinc selenide (ZnSe), which is transparent to most visible light but is yellow in color; or gallium arsenide (GaAs) or germanium (Ge), which are opaque to visible light.

Regardless of which laser cutting process is used, the resultant metal gobo in all but the simplest designs includes unwanted connecting links supporting interior details of the metal pattern. Metal gobos also require a certain minimum thickness, depending upon the particular metal used, in order to survive the intense heat of a high-powered entertainment lighting instrument. The thickness of the gobo limits the crispness of the projected image, because it is easier to focus an image formed by a thin gobo than it is to focus an image formed by a thick gobo. Further, metal gobos require a corresponding minimum width of connecting links and other details so as to provide sufficient material strength to support itself, which limits the resolution of fine details obtainable with either stamped or laser-cut metal gobos.

Neodymium:yttrium-aluminum-garnet (Nd:YAG) lasers, having a characteristic wavelength of 1.06 micrometers and a typical beam diameter of 0.001 inch or smaller, can cut any metal that can be cut with a carbon-dioxide laser, but at a significantly slower speed. Nd:YAG lasers are seldom used with nonmetal materials because of low absorption rates of such materials for the energy at 1.06 micrometers. Nd:YAG lasers are used to some advantage for processing metals inside glass or quartz enclosures with no harm to the window.

More recent gobos have been fabricated as a layer of light reflective material, such as aluminum, bonded to a surface of a transparent plate such as heat resistant glass. The light reflective layer has an opening which is in the shape of the image. A portion of the light beam passes through the opening to produce a beam having the shape of the image. The reflective layer serves to reflect a portion of the light beam which does not pass through the opening. Glass gobos of this type are very resistant to the intense heat of entertainment lighting beams, and produce images devoid of unwanted support members or connecting links, all portions of the reflective layer being supported by the transparent substrate. Glass gobos are manufactured by a relatively expensive and time-consuming process, which is described in U.S. Pat. No. 4,779,176.

As described in the above noted patent, a layer of positive photo resist material is deposited in the shape of a desired image onto a large, thin sheet of transparent glass. A thin layer of aluminum then is deposited over the glass and the photo resist layer. A multi-layer dielectric coating deposited over the aluminum layer forms a "black mirror", which is a non-reflective surface that absorbs visible light. The glass sheet and the various coatings are then exposed to acetone which dissolves the photo resist and lifts all the layers of material immediately over the photo resist while having no effect on the glass. The acetone etch process produces an opening through the deposited layers which is in the shape of the desired image. The process can be used to produce a plurality of glass gobos on a single sheet, which is then scribed and broken to separate the individual gobos.

The process described above requires a photo mask having the desired image formed therein to facilitate deposition of the photo resist layer, and significant lead times for the manufacture of finished gobos, thereby making the process more suitable for production of relatively large numbers of gobos than for smaller, "made-to-order" production. Although focused-beam carbon-dioxide lasers can be used as described to achieve economic production of laser-cut metal gobos in small quantities, no comparable method of using laser beams on glass gobos has heretofore been employed, because the wavelength of carbon-ioxide lasers is readily absorbed by materials transparent to visible light and will etch, crack, or otherwise destroy a transparent substrate.

SUMMARY OF THE INVENTION

One aspect of the present invention comprises a light pattern generator for producing an image in a light beam. The generator includes a transparent plate for placement in the light beam. A light reflective layer is bonded to a surface of the plate with the reflective layer having an opening which is in the shape of the image. In a preferred embodiment, the reflective layer is characterized in that the layer is highly reflective to visible light and is absorptive of certain wavelengths of near infra-red radiation, in the range of 850 to 2000 nm. A portion of the light beam passes through the opening in the reflective layer to produce a beam having the shape of the opening. The reflective layer serves to reflect a portion of the light beam which does not pass through the opening.

Another aspect of the present invention comprises an apparatus for making a light pattern generator. The apparatus includes a general purpose computer, a laser marking system, and a movable support table. The general purpose computer serves as a host computer interface to the laser marking system. The movable support mechanism sequentially places one of a plurality of blank gobos in position for the laser marking system to inscribe images upon them. The laser marking system writes an image onto a transparent plate having a reflective layer bonded thereto, the image being dependent upon digital computer data selected at the host computer interface and loaded into a control unit of the laser marking system. The laser beam has a very narrow beam diameter and a characteristic wavelength in the near infra-red region. The reflective layer of the blank gobo is absorptive to the energy of the laser beam and is ablated away from the transparent plate leaving an opening in the shape of the desired image.

Another aspect of the present invention comprises a method for making a light pattern generator. The method includes the steps of: bonding to a transparent plate a layer of reflective material which reflects visible light and absorbs certain wavelengths of near infra-red radiation; generating a laser beam having a very small beam diameter at a certain infra-red wavelength; directing the laser beam onto the transparent plate; steering the laser beam across a surface of the transparent plate; allowing the energy of the beam to ablate reflective material from certain areas of the reflective layer; and switching the laser beam on and off to control which areas of the reflective layer are affected by the laser beam.

A further aspect of the invention comprises a color light pattern generator, and includes a transparent plate having a layer of near infra-red absorbing material thereon, with a layer of dichroic filter material applied over the absorbing layer. An infra-red laser beam is used to ablate certain areas of the absorbing layer and the filter material above to create an opening in the shape of a desired image within a field of color filter material.

Another aspect of the present invention comprises a multiple-color light pattern generator having plural dichroic filter layers separated by near infra-red absorbing layers on one or both sides of a transparent substrate. An infra-red laser beam is used to ablate one or more absorbing layers and the filter material above to create openings of different shapes in different layers. A multiple-color light pattern generator projects an image in two or more colors without requiring the use of separate color filtering devices.

BRIEF DESCRIPTION OF THE DRAWINGS

FIGS. 8A, 8B and 8C are plan views of light pattern generators showing typical raster-scan images;

DETAILED DESCRIPTION

Figure 1:
FIG. 1 is a sectional view of a blank light pattern generator according to a first aspect of the present invention.
Figure 2:
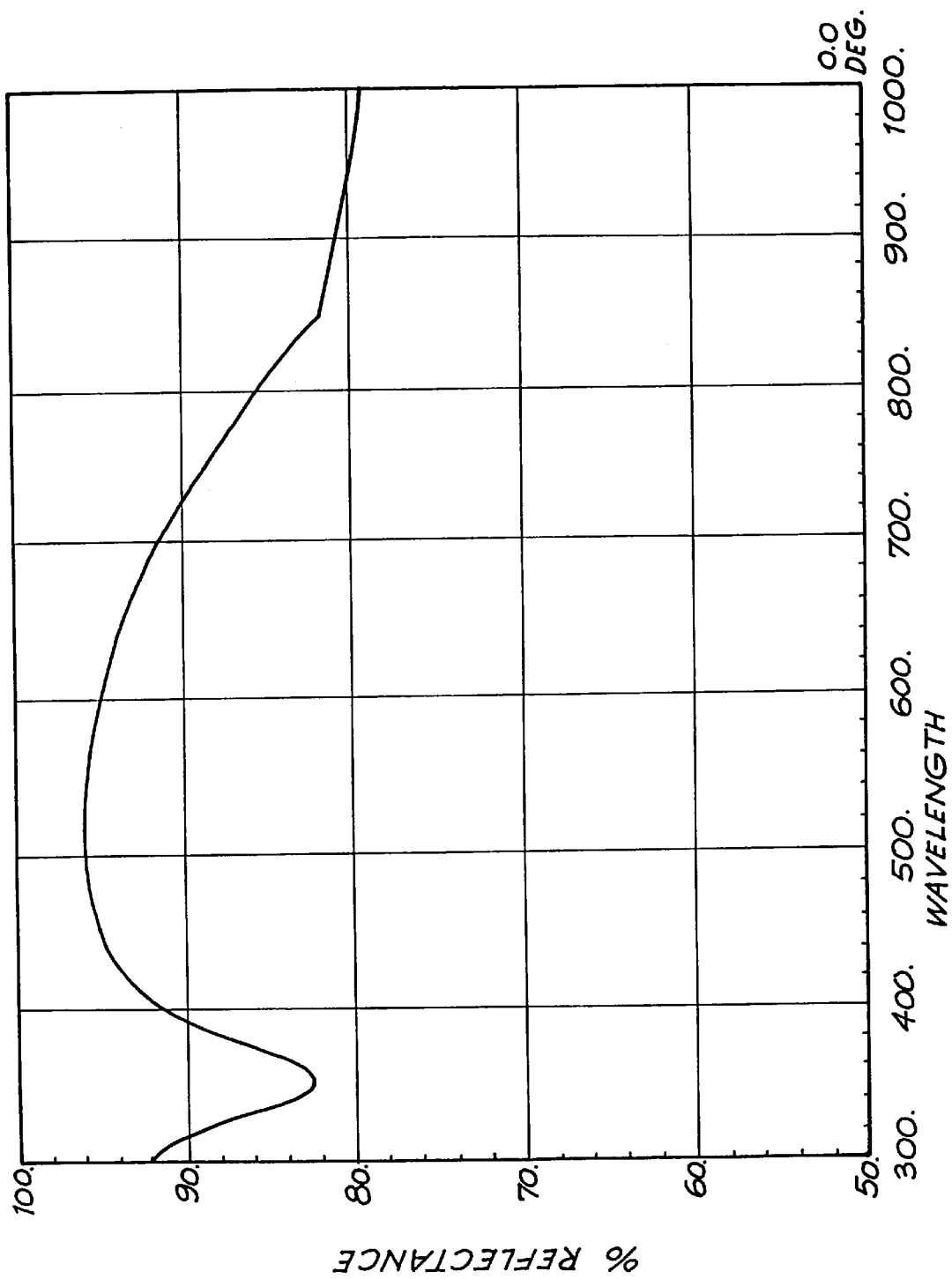
FIG. 2 shows the output spectral response curve of an aluminum coating.

Referring now to FIG. 1, there is illustrated a blank light pattern generator 10 which can be used to make a finished light pattern generator, or gobo, suitable for entertainment lighting applications. The blank light pattern generator includes a transparent plate 12 having a reflective coating 14 bonded to one surface. The coating includes a layered stack of enhanced aluminum bonded to a surface 11 of the plate 10. The reflective layer 14 reflects visible light in the 400 to 700 nanometer (nm) range and absorbs near infrared radiation in the range of 850 nm to 2 micrometers (um), as shown in the graph of reflectance versus wavelength in FIG. 2. The reflecting and absorbing ranges can be varied, however, without departing from the scope of the invention. The transparent plate is preferably made of glass having a low coefficient of thermal expansion, such as 7059 glass made by Corning, Inc, of Corning, N.Y., or Tempax glass made by Schott Glasswerke of Mainz, Germany, but may also be made of a clear plastic material for low-heat applications. The reflective layer 14, designed to be ablated away from the transparent plate by the application of a narrow-diameter laser beam operating in the near infra-red range, is therefore absorptive of radiation at that wavelength while being highly reflective of visible light.

In a preferred embodiment, reflective layer 14 is preferably a four-layer stack of enhanced aluminum bonded by a vacuum-deposition process to produce a coating that is very reflective of visible light, absorptive of near infra-red radiation at 1.06 micrometers, and yet is stable at high temperatures. A reflective layer of chrome may also be utilized to obtain good reflectivity to visible light, absorption near infra-red radiation, and stability at low to medium temperatures. A reflective layer of Inconel may be utilized to obtain fair reflectivity to visible light, although the material is not very opaque. Inconel ablates well, but is stable only at relatively low temperatures. Dielectric cold mirrors have good reflectivity, and can be used to make multi-color gobos.

Figure 3:
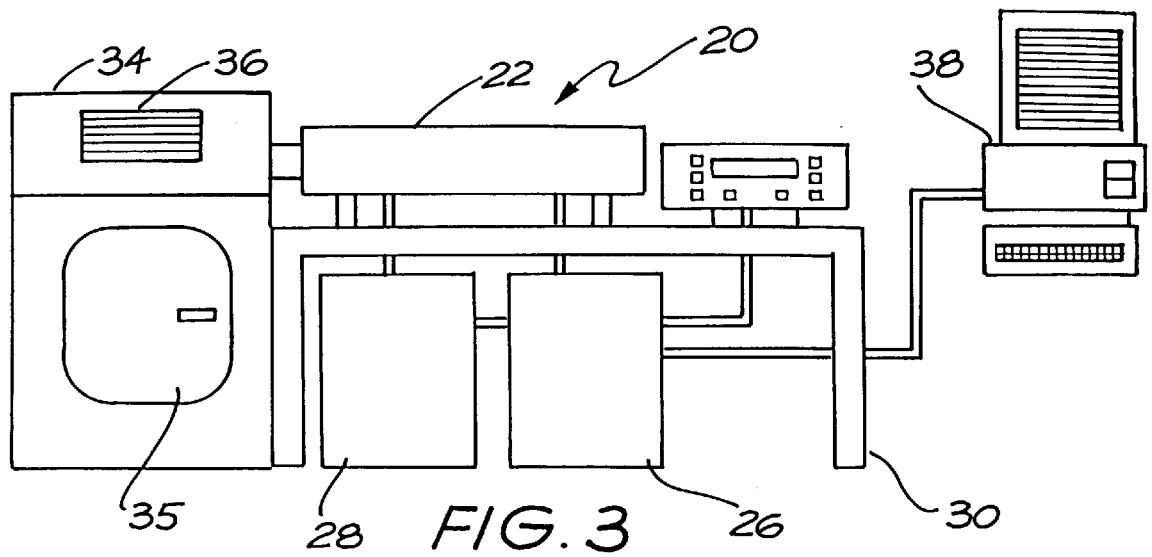
FIG. 3 is a block diagram of a laser marking system according to a second aspect of the present invention.
Figure 4:
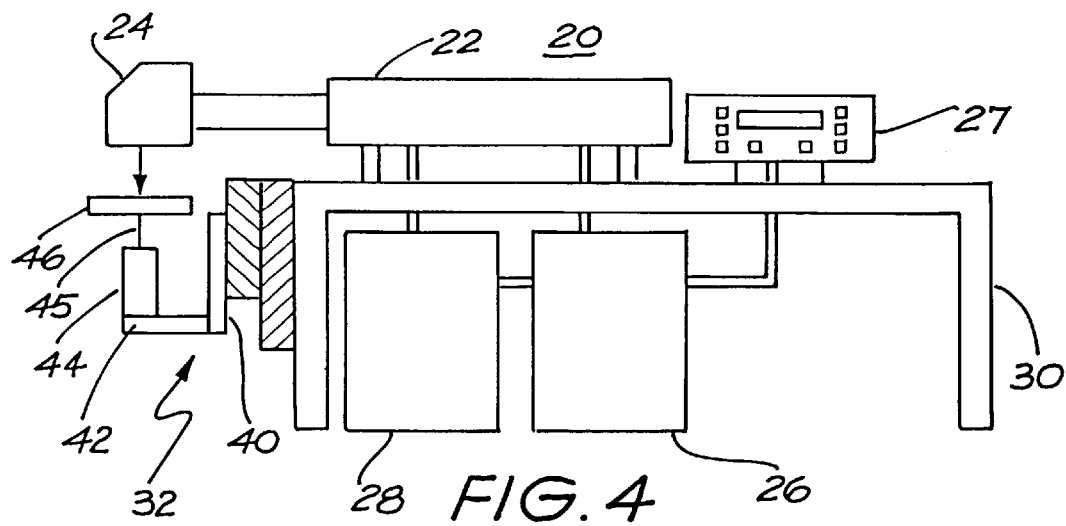
FIGS. 4 and 5 are block diagrams of the system of FIG. 3 showing the marking components in detail.
Figure 5:
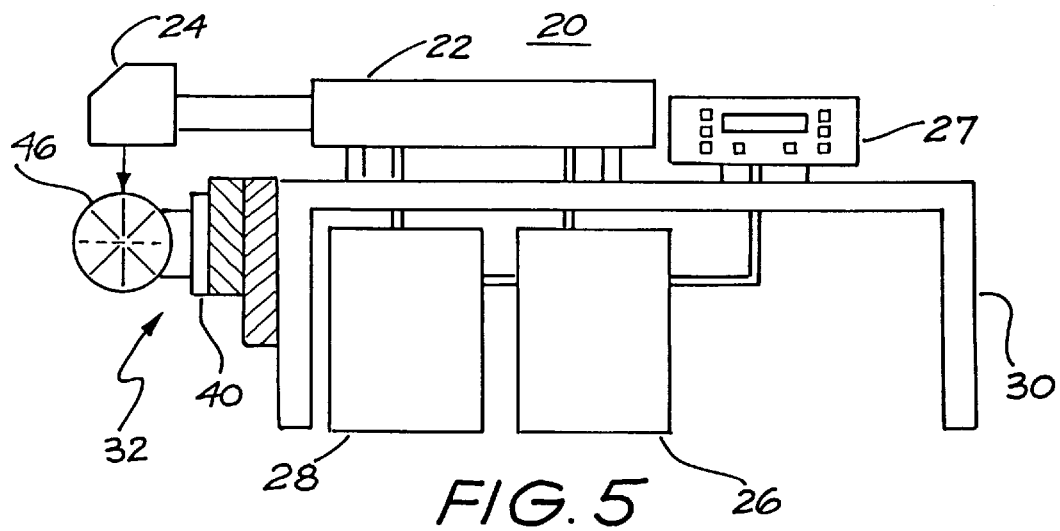

Referring now to FIGS. 3, 4 and 5, a laser marking system 20 includes a laser head 22, a deflection mirror assembly 24, a control unit 26 having a separable control panel unit 27, and a water supply unit 28. A laser marking system of this type is shown in more detail in FIGS. 4 and 5. The laser head 22, having deflection mirror assembly 24 mounted at one end thereof, is supported by a work table 30. A movable support mechanism 32 is mounted to one end of work table 30 in the proximity of deflection mirror assembly 24. The support mechanism 32 is surrounded by a protective enclosure 34. The enclosure 34 includes an access door 35 and a protective window 36. The access door is connected to a safety interlock network which douses the laser beam when the door is opened. The protective window provides a safe way to visually monitor the laser marking operation within the enclosure.

A general purpose computer 38 connects to the control unit 26, and provides a source of digital computer data for controlling the laser marking operation. A serial data port on computer 38 connects to a serial data port on control unit 26 for transmitting image control files from the computer to the control unit. A suitable program running on the computer converts digital data files representing desired images into image control files that conform to the requirements of the laser marking system. Images can be designed on the computer and the image files converted for use with the laser marking system, or images created on other computers elsewhere can be loaded into the computer 38 via a network or floppy disk drive and then converted. Alternatively, the control unit 26 includes a floppy disk drive for loading and/or saving properly converted image control files.

Support mechanism 32 includes a rotary indexer 40 which is operable to rotate a primary surface 42 through an arc of 90 degrees. A stepper motor 44 is mounted perpendicularly to the primary surface. The stepper motor includes a shaft 45 which extends beyond the housing of the motor. In operation, a plurality of blank gobos are mounted around the periphery of a wheel 46. The gobo wheel 46 is mounted on the end of shaft 45. The primary surface 42 is positioned horizontally so that one of the plurality of blank gobos 10 is placed in a position at which the laser beam generated by laser head 22 can be scanned across the surface of the blank gobo by the action of deflection mirror assembly 24. The system writes the image upon the blank gobo by a process to be described in detail hereinafter, and the stepper motor is energized by the control unit to rotate another blank gobo into position for writing another image thereupon.

To initiate the process, image control files are loaded into the control unit, and an operator manipulates control devices provided on control panel 27. Thereafter the laser marking system inscribes images upon blank gobos mounted on the gobo wheel, one at a time in sequence. The sequence can be controlled to write images on every blank gobo mounted on the wheel. Alternatively, the sequence can be controlled to write images on selected gobos mounted on the wheel. The sequence can be controlled to write a different image on each blank gobo mounted on the wheel. Alternatively, the same image can be written on more than one or all of the gobos mounted on the wheel.

After the images have been written on the gobos, the rotary indexer 40 is rotated through 90 degrees, as shown in FIG. 5, to present the edge of the gobo wheel to the laser beam. The marking system then writes an identifying bar code on the edge of each of the plurality of gobos, rotating the stepper motor to present each gobo in sequence to the laser beam.

At the conclusion of the process, an operator opens the access door and removes the gobo wheel from the motor shaft. The operator may then install a new wheel having blank gobos mounted thereupon and repeat the process using the same or a different sequence.

Figure 6:
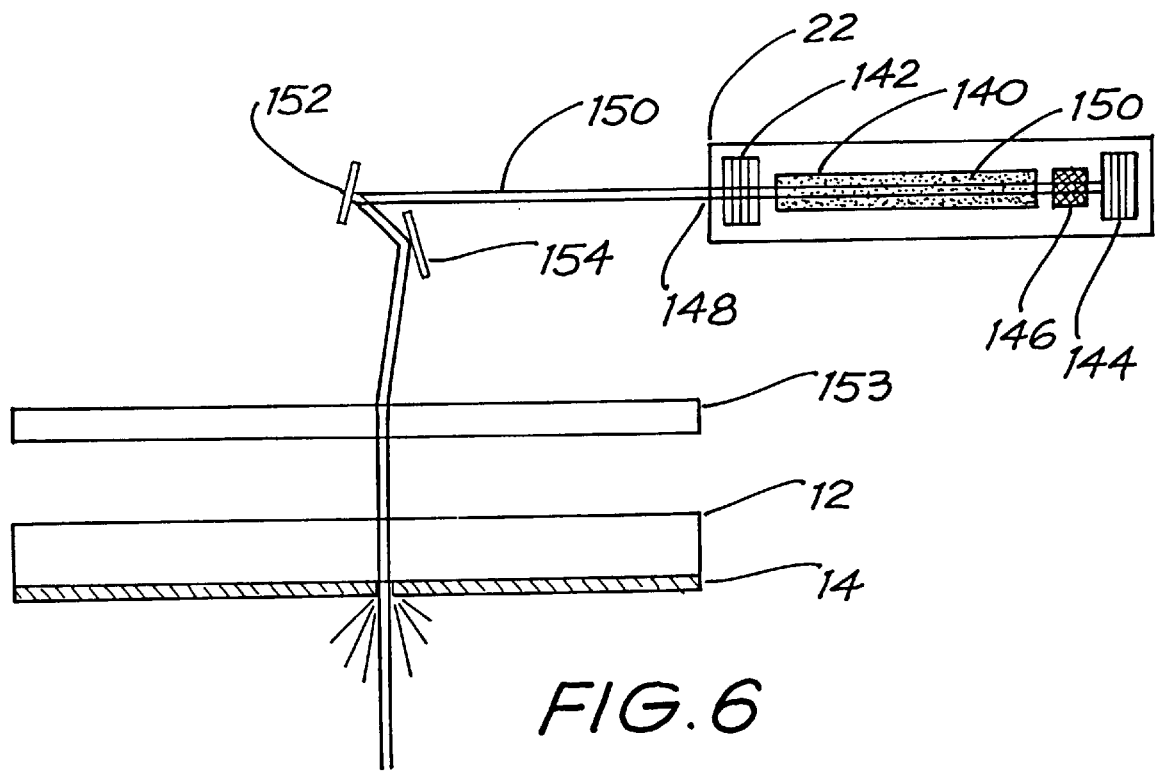
FIG. 6 is a sectional view of a light pattern generator illustrating laser ablation of reflective material according to a third aspect of the invention.

Referring now to FIG. 6, The laser head 22 includes a Q-switched, Neodymium:Yttrium-Aluminum-Garnet (Nd:YAG) industrial laser unit which generates a laser beam having a wavelength in the near infra-red range, specifically at 1.06 micrometers and a beam diameter of 0.001 inch. The Nd:YAG laser is selected over other lasers because glass and plastic are transparent to the 1.06 um wavelength, and because the beam diameter is quite small. Some Nd:YAG lasers require additional lenses to increase the beam diameter to 0.001 inches. In contrast, the carbon-dioxide (CO2) laser widely utilized for the laser marking of metals has a wavelength of 10.6 um at the far end of the mid infra-red range, and a beam diameter of about one half inch. The carbon-dioxide laser at 10.6 um will etch or destroy glass or plastic, making the transparent substrate unsuitable for image projection. The half-inch diameter beam requires using a mask to block portions of the laser beam, the manufacture of said mask presenting the same problems which the present invention overcomes.

The Nd:YAG laser unit 22 includes a Q-switch 146 to modulate the intensity of the laser between an ON state and an OFF state. The power of the beam in the ON state is determined by the laser power supply located within and controlled by the control unit 26. The Q-switch 146, a crystal in the laser cavity and is used to rapidly change the Q figure of an optical resonator such as a laser beam. The Q-switch crystal 146 is located between a lasing rod 140 and a primary mirror 144. A secondary mirror 142 is located near an exit aperture 148 of the laser unit 22. Under normal operation, the laser rod 140 is energized and light rays travel the length of the rod resonating between mirrors 142 and 144 to form a beam 150 of coherent light having a characteristic wavelength. When the crystal 146 is energized by high frequency electrical current in the radio frequency range, the laser beam 150 is deflected from its normal path towards primary mirror 144, and the beam is effectively extinguished to achieve an OFF state. When the crystal is de-energized, the laser beam is restored to normal ON state operation. The beam 150 exits the laser unit 22 and travels to X-Y deflection mirrors 152 and 154 contained within deflection mirror assembly 24. The beam 150 is directed by mirrors 152 and 154 through a flat field lens 55 and towards a blank gobo 10. The beam 150 passes harmlessly through transparent substrate 12 and burns away portions of reflective coating 14. Mirrors 152 and 154 steer the beam 150 across the blank gobo 10 ablating the reflective coating 14 in certain places to form an opening in the shape of a desired image. The ON-OFF state of the laser unit 22 is modulated by the action of the Q-switch 146 to control which areas of the reflective coating are ablated by the beam.

Other suitable lasers include Nd:YLF at 1.047 to 1.053 um, Nd:Glass at 1.06 um, Nd:YAP at 1.08 um, Ho:YLF at 2.06 um, Ho:YAG at 2.1 um, and Tm:YAG at 2.02 um. The Nd:YAG laser is chosen for its availability as well as its physical properties, the Nd:YAG laser being very popular for cutting metals.

Figure 7A:
FIGS. 7A, 7B and 7C are plan views of light pattern generators showing typical vector-scan images.
Figure 7B:
Figure 7C:
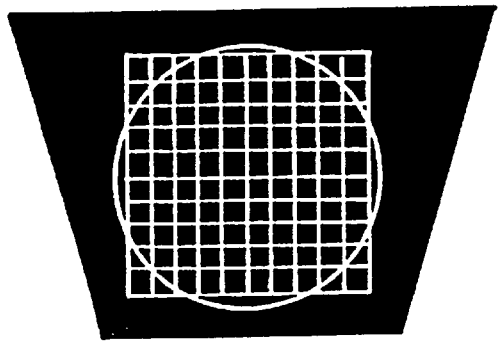

Images are written to the blank gobos by the laser ablation method described above utilizing one of two scanning techniques. A vector-scan technique draws the outlines of an image first, and then fills-in the solid areas of the image. The outlines and solid areas become the opening in the shape of the desired image as the laser beam burns away reflective coating wherever the beam hits. Typical vector-scan images are shown in FIG. 7A, 7B, and 7C. FIG. 7A illustrates fairly detailed image. FIG. 7B shows a complete ring pattern devoid of any connecting links which are characteristic of prior art metal gobos. FIG. 7C shows a circle superimposed upon a grid. Vector-scan images can be drawn on a blank gobo in 2 to 15 seconds, depending upon the complexity of the image.

Figure 8A:
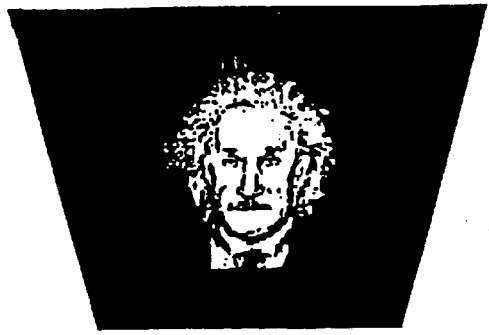
Figure 8B:

A raster-scan technique scans the entire surface of the blank gobo one line at a time, modulating the ON-OFF state of the laser unit to ablate certain areas of the reflective layer to create a "pixellated" or "bit-mapped" image. Photographs can be reproduced as glass gobos utilizing the raster-scan technique. Typical raster-scan images are shown in FIG. 8A and 8B. FIG. 8A shows the likeness of a person. FIG. 8B shows a representation of an architectural structure. The laser marking system can be programmed to skip certain areas of the blank gobo where no image opening is to be written, thereby shortening the processing time by not scanning large areas where the beam would be turned off. Therefore, raster scan images can be written on a blank gobo in one to two minutes depending on the complexity of the image.

The X-Y deflection mirrors 152, 154 utilized in the laser marking system are much smaller and lighter than the X-Y table used with focused beam carbon-dioxide laser cutting machines, and are therefore much faster and capable of drawing an image in much less time. Galvanometers used to move such X-Y scanning mirrors typically move at 0.000025" per step, and yet are driven so quickly that no stepping motion is perceived; rather, a smooth, fast laser writing operation is achieved with very high accuracy and precision.

Figure 9:
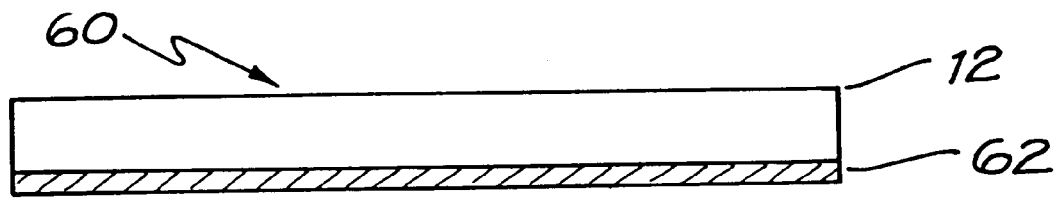
FIG. 9 is a sectional view of a one-color light pattern generator.

In another aspect of the present invention, there is shown in FIG. 9 a blank color gobo 60, comprising a transparent plate 12 having a multi-layer dielectric coating of dichroic filter material 62 deposited thereupon. Dichroic filters work on an interference principle essentially separating two colors out of a white light source, one color being transmitted and the other color, the complement of that being transmitted, being reflected. The color transmitted through the dichroic filter depends upon the types of materials used in the filter layers and their refractive indices, the thickness of each layer, the number of layers, and the angle of incidence of white light striking the filter. Dichroic filters of this type are used in a color wheel assembly for lighting equipment as described in U.S. Pat. No. 4,800,474, which is incorporated herein by reference.

Blank color gobos such as 60 can be mounted about the periphery of a wheel 46 (FIG. 5) and loaded into a laser marking system 20. Utilizing the process described above, a laser beam 150 writes an image onto the blank color gobo, burning away the dichroic filter coating so that an opening having the shape of a desired image is formed in the coating 62.

Figure 10A:
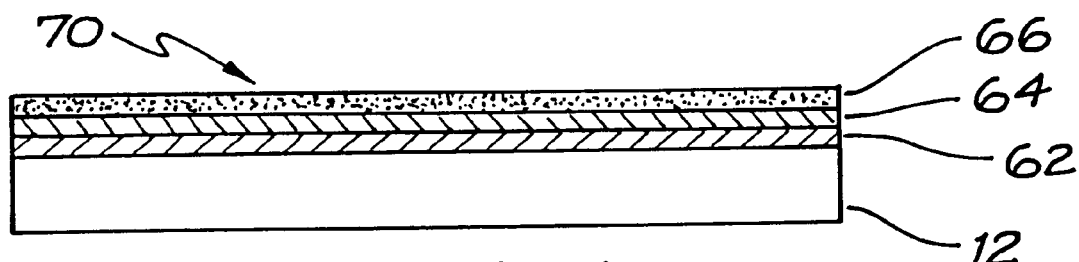
FIG. 10A is a sectional view of a two-color light pattern generator.
Figure 10B:
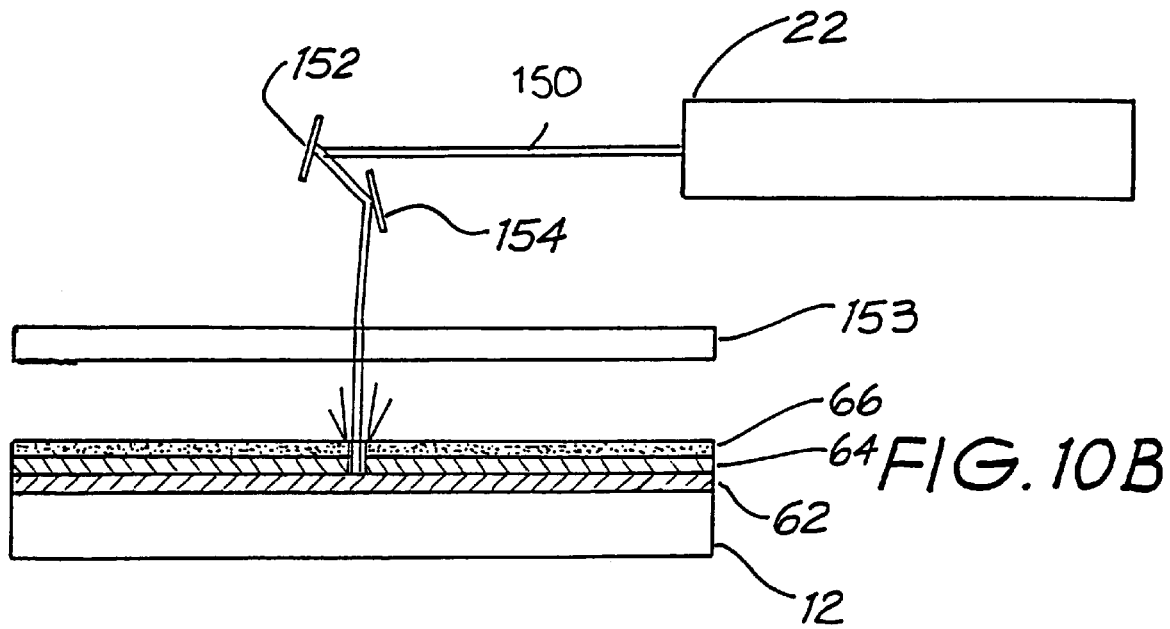
FIG. 10B is sectional view of laser ablation of a two-color light pattern generator in accordance with the invention.

FIG. 10A shows a blank, two-color gobo 70 comprising a transparent plate 12, a first dichroic filter coating 62, a layer of visibly transparent oxide 64, and a second dichroic filter coating 66. Coatings 62 and 66 have different characteristics such that each coating transmits a different color than the other coating. The transparent oxide layer 64 is designed to be transparent to visible light and yet absorptive of near infra-red radiation. Blank, two-color gobos can be mounted about the periphery of a wheel 46 and loaded into a laser marking system 20. Utilizing the process described above (see FIG. 10B), a laser unit 22 generates a low-power laser beam 150 and writes an image onto the blank, two-color gobo, burning away the filter layer 66 and absorbing in the oxide layer 64, so that an opening having the shape of a desired image is formed in the coating 66. Coating 62 remains intact, coloring the image. A two-color gobo is formed thereby such that the desired image is projected having a certain color which is dependent upon the characteristics of coating 62, and appears within a field of background color which is dependent upon the characteristics of both coatings 62 and 66.

Figure 11A:
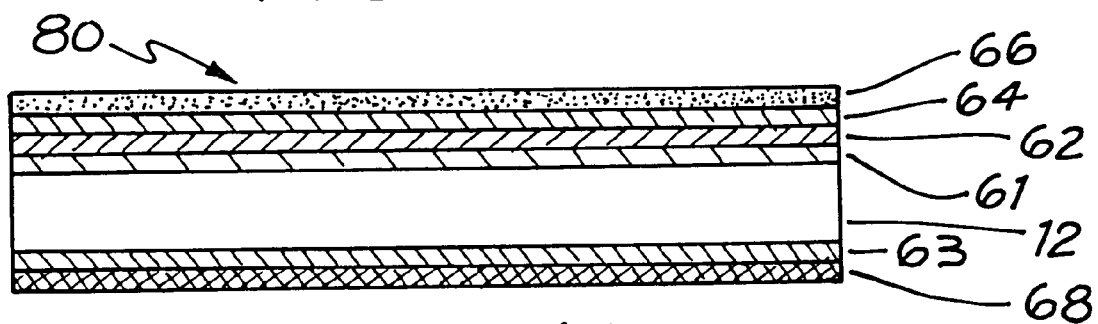
FIG. 11A is a sectional view of a three-color light pattern generator.
Figure 11B:
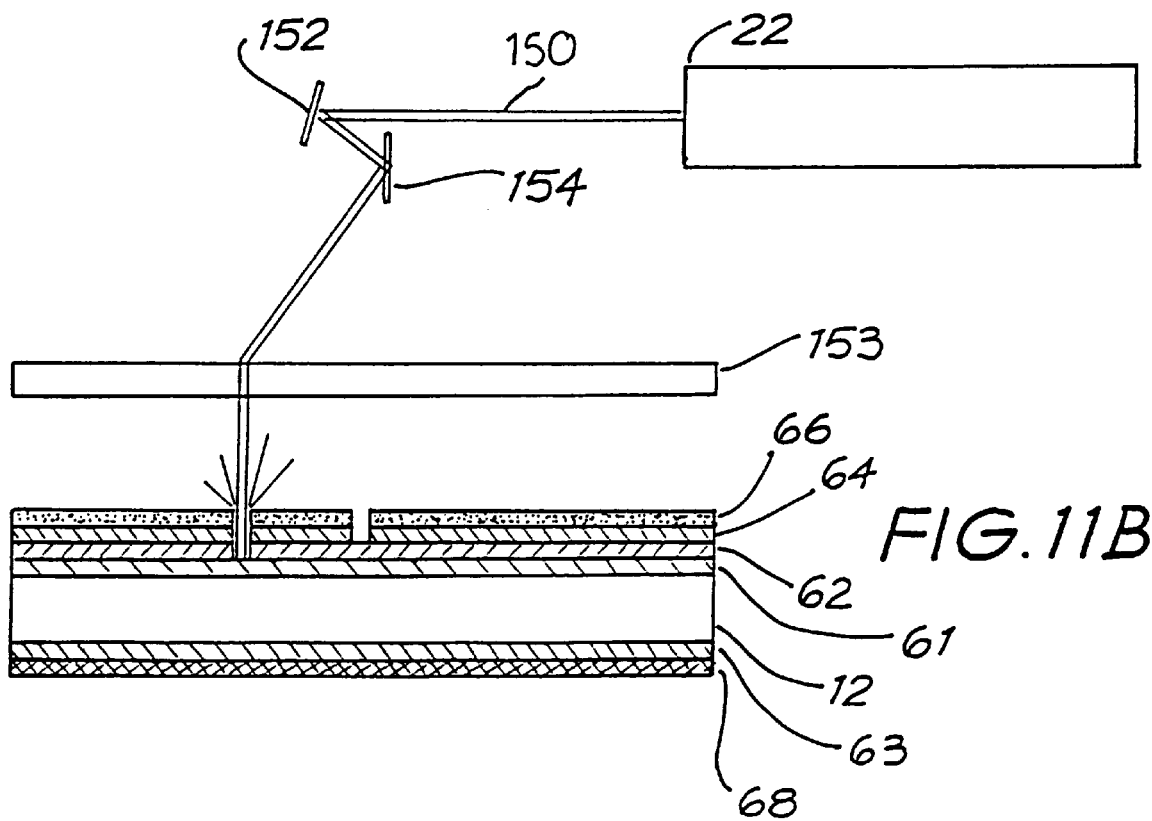
FIG. 11B is a sectional view of the production of a three-color light pattern generator in accordance with the invention.

FIG. 11A shows a blank, three-color gobo 80 comprising a transparent plate 12, a first layer of transparent oxide 61 such as Indium Tin Oxide (ITO), which is transparent to visible light and yet absorbs energy in the near infra-red region, deposited on a first surface of the plate, a first dichroic filter coating 62 deposited over the first layer of transparent oxide, a second oxide layer 64 deposited over coating 62, a second filter coating 66 deposited over oxide layer 64, a third oxide layer 63 deposited upon a second surface of the plate 12, the second surface being opposite the first surface, and a third dichroic filter coating 68 deposited over the oxide layer 63. Blank, three-color gobos can be mounted about the periphery of a wheel 46 and loaded into a laser marking system 20. Utilizing the process described above (see FIG. 11B), a laser unit 22 generates a low-power laser beam 150 and writes an image onto the blank, three-color gobo, burning away only the filter layer 66, so that an opening having the shape of a desired image is formed in the coating 66. The oxide layer 64 is provided to block the laser beam from burning away filter layer 62, absorbing the energy thereof before it reaches the layer 62. Coating 62 can remain intact in places, coloring the image, or may be burned away in places so that coating 68 colors the image. The wheel may be turned over so that laser beam 150 writes an image onto the other surface of the gobo, burning away the coating 68 in selected place to allow the colors formed by coatings 62 and 66 to be transmitted. In other places, coating 68 remains intact, and may cooperate with either coating 62 or coating 66 to color the image. A three-color gobo is formed thereby such that the desired image is projected having certain colors which are dependent upon the characteristics of coatings 62, 66, and 68.

Figure 12A:
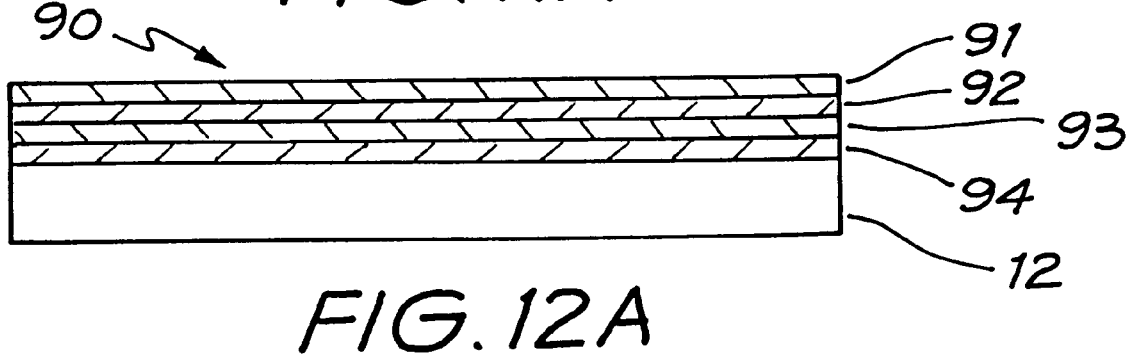
FIG. 12A is a sectional view of a cold-mirror light pattern generator.
Figure 12B:
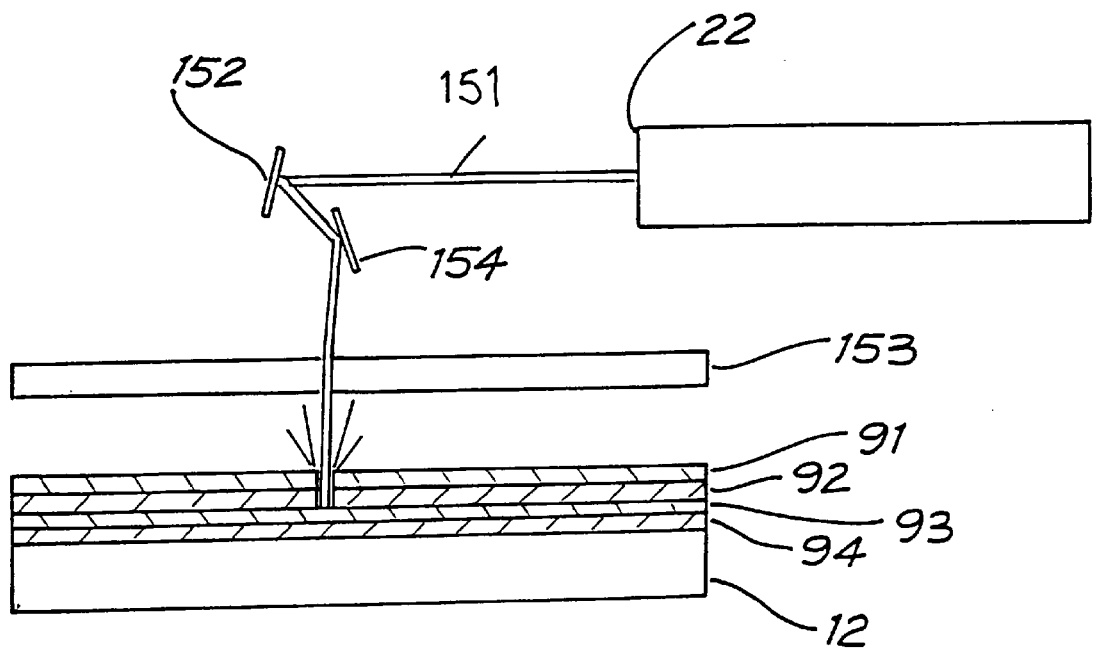
FIG. 12B shows laser ablation of the cold-mirror light pattern generator of FIG. 12A.

FIG. 12A shows a blank, cold-mirror gobo comprising a transparent plate 12 having multi-layer dielectric coatings 91, 92, 93, and 94 deposited thereupon. A cold-mirror reflects all wavelengths of visible light. As described above, a very low-power laser beam (see FIG. 12B) writes an image onto the gobo using multiple passes, burning away one or more of the cold-mirror layers to allow light rays of selected wavelengths to pass through. The colors of the resulting image depend upon the characteristics of the coatings and the extent to which the coatings are burned away.

Figure 13:
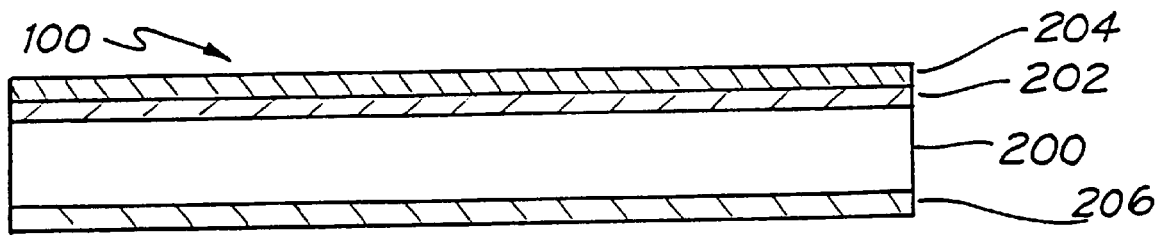
FIG. 13 shows a light pattern generator for generating a colored light pattern on a black background.

In a further embodiment of the invention, a light pattern generator can generate a color image on a black background. Such a light pattern generator is shown in cross-section in FIG. 13. Such a light pattern generator has a reflective layer 204 on one side of a transparent substrate 200, backed by a transparent oxide layer 202, and has a color filter layer 206 on the other side.

To produce such a light pattern generator, an opening is burned through layer 204 with a laser in the manner previously described, the laser being stopped by layer 202. The resulting opening thus provides a colored light stencil on a black background.

Although several embodiments of the invention have been illustrated and described, it will be understood that the invention is not limited to the embodiments disclosed, but is capable of numerous rearrangements, modifications and substitutions without departing from the scope of the invention.

What is claimed is:

1. A color light pattern generator, comprising:

a transparent plate;

a layer of infra-red absorbing material substantially transparent to visible light on a surface of said transparent plate;

a layer of dichroic filter material on said substantially transparent infra-red absorbing material, said layers of absorbing and filter material having an opening therein of a desired shape to allow generation of a pattern corresponding to said opening in a field of background color from a beam of light.

2. The color light pattern generator of claim 1, further comprising:

a second substantially transparent infra-red absorbing layer on said dichroic filter layer; and a second dichroic filter layer on said second substantially transparent infra-red absorbing layer, said second absorbing and filter layers having a second opening therein.

3. The color light pattern generator of claim 2, further comprising:

a third substantially transparent infra-red absorbing layer on another surface of said transparent plate; and a third dichroic filter layer on said third substantially transparent infra-red absorbing layer, said third absorbing and filter layers having a third opening therein.

4. The color light pattern generator of claim 1, wherein said substantially transparent infra-red absorbing material comprises indium tin oxide.

5. A color light pattern generator, comprising:

a transparent plate;

a first layer of dichroic filter material on said transparent plate;

a layer of infra-red absorbing material transparent to visible light on said first layer of dichroic filter material; and a second layer of dichroic filter material on said layer of infra-red absorbing material, said second layer having an opening therein of a desired shape to allow generation of a pattern corresponding to said opening from a beam of light.

6. A color light pattern generator according to claim 5, wherein said first and second layers of dichroic filter material have different optical transmission characteristics.

7. A color light pattern generator according to claim 5, wherein said first layer of dichroic filter material has an opening therein of a desired shape.

8. A color light pattern generator, comprising:

a transparent plate;

a layer of infra-red absorbing material transparent to visible light on a first surface of said transparent plate;

a layer of reflective material on said infra-red absorbing material; said layer of reflective material having an opening therein of a desired shape; and a layer of dichroic filter material on a second surface of said transparent plate.

9. A color light pattern generator according to claim 8, wherein said first and second surface of said transparent plate are opposite one another.

10. A color light pattern generator, comprising:

a transparent plate;

a first layer of infra-red absorbing material transparent to visible light on a first surface of said transparent plate;

a first layer of dichroic filter material on said first layer of infra-red absorbing material;

a second layer of infra-red absorbing material transparent to visible light on said first layer of dichroic filter material;

a second layer of dichroic filter material on said second layer of infra-red absorbing material, said second layer of dichroic filter material having an opening therein of a desired shape;

a third layer of infra-red absorbing material on a second surface of said transparent plate; and a third layer of dichroic filter material on said third layer of infra-red absorbing material.

11. A color light pattern generator according to claim 10, wherein said first layer of dichroic filter material has an opening therein of a desired shape.

12. A color light pattern generator according to claim 11, wherein said third layer of dichroic filter material has an opening therein of a desired shape.

13. A color light pattern generator according to claim 10, wherein said third layer of dichroic filter material has an opening therein of a desired shape.

\* \* \* \* \*